Figure 1:
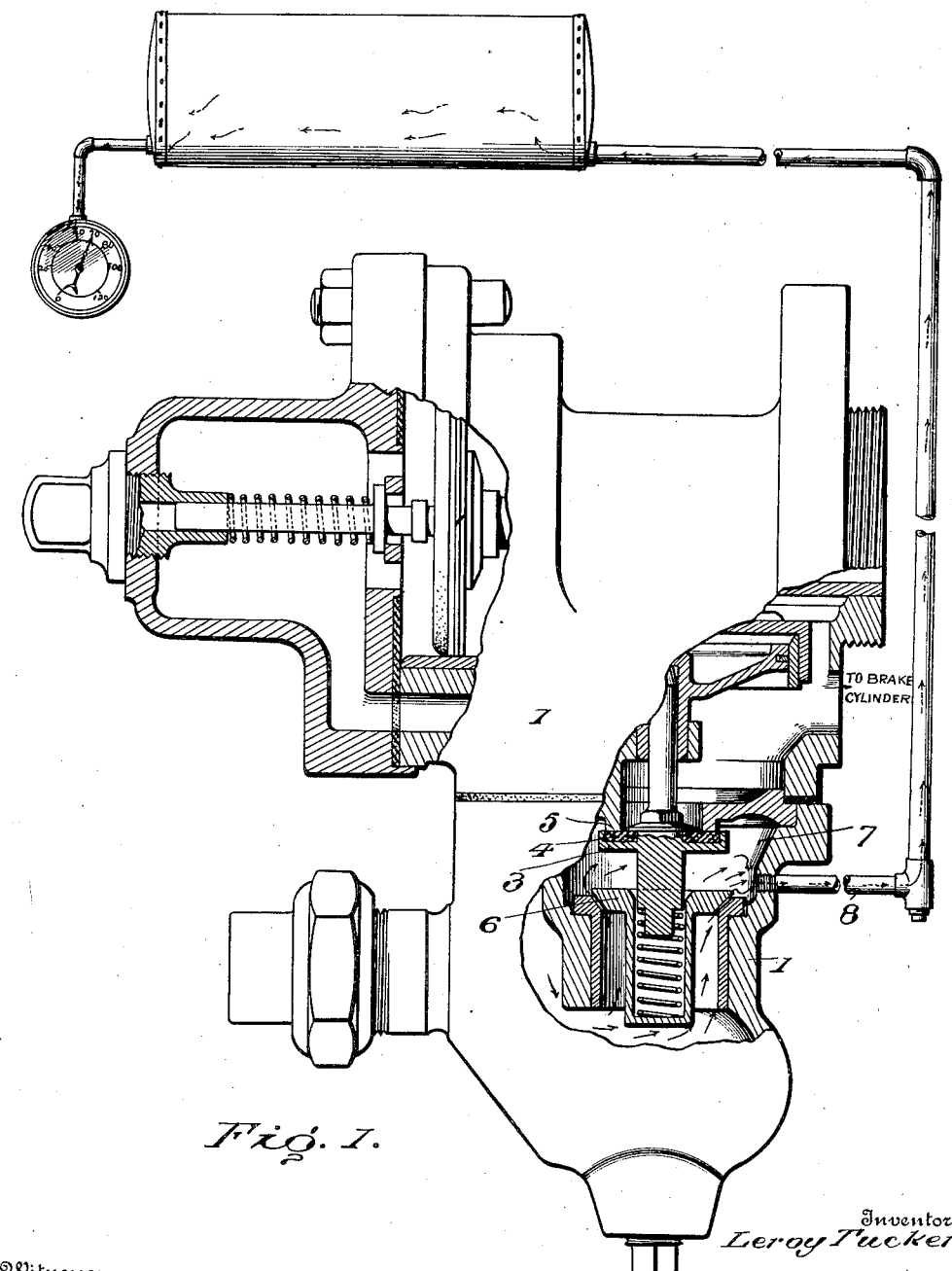

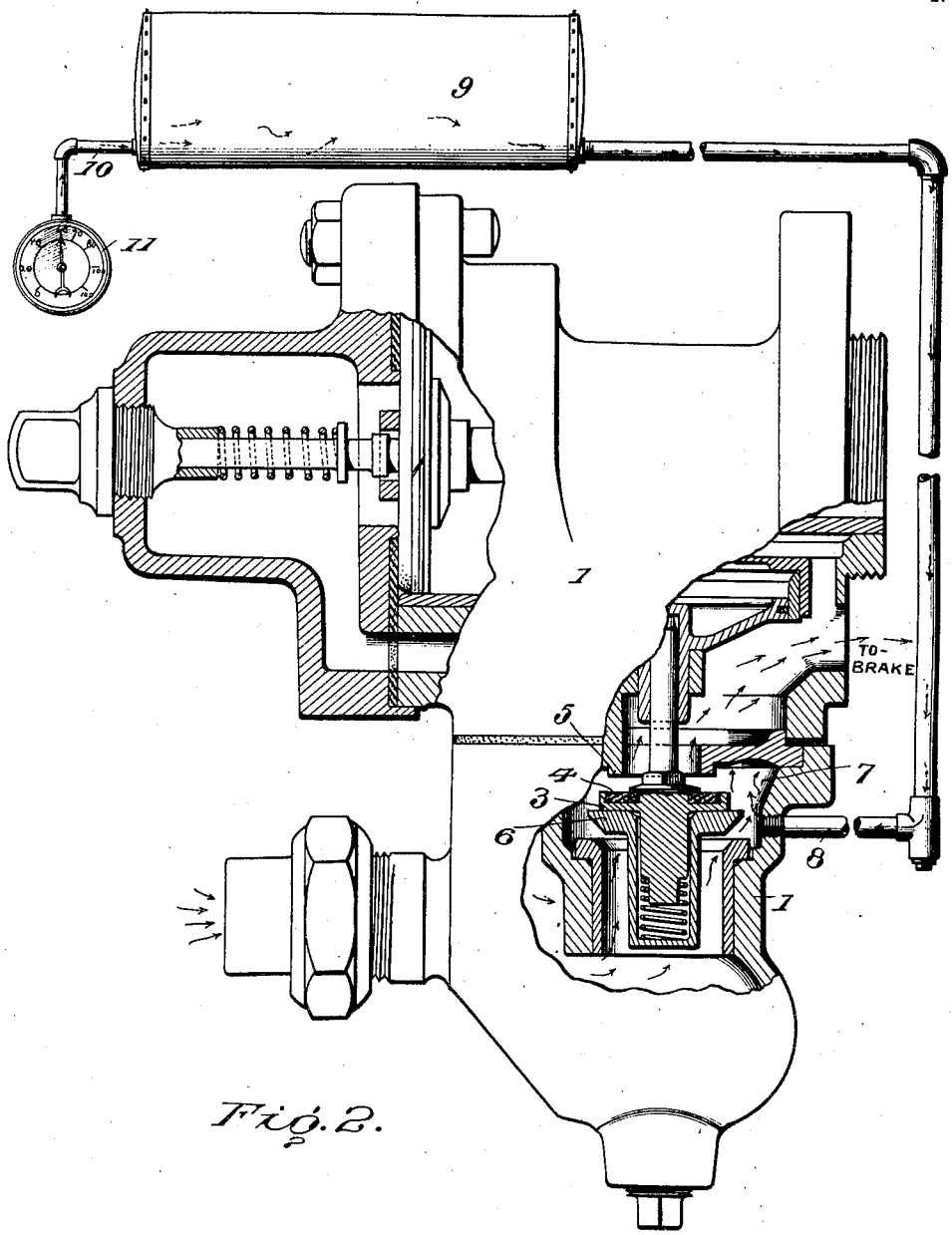

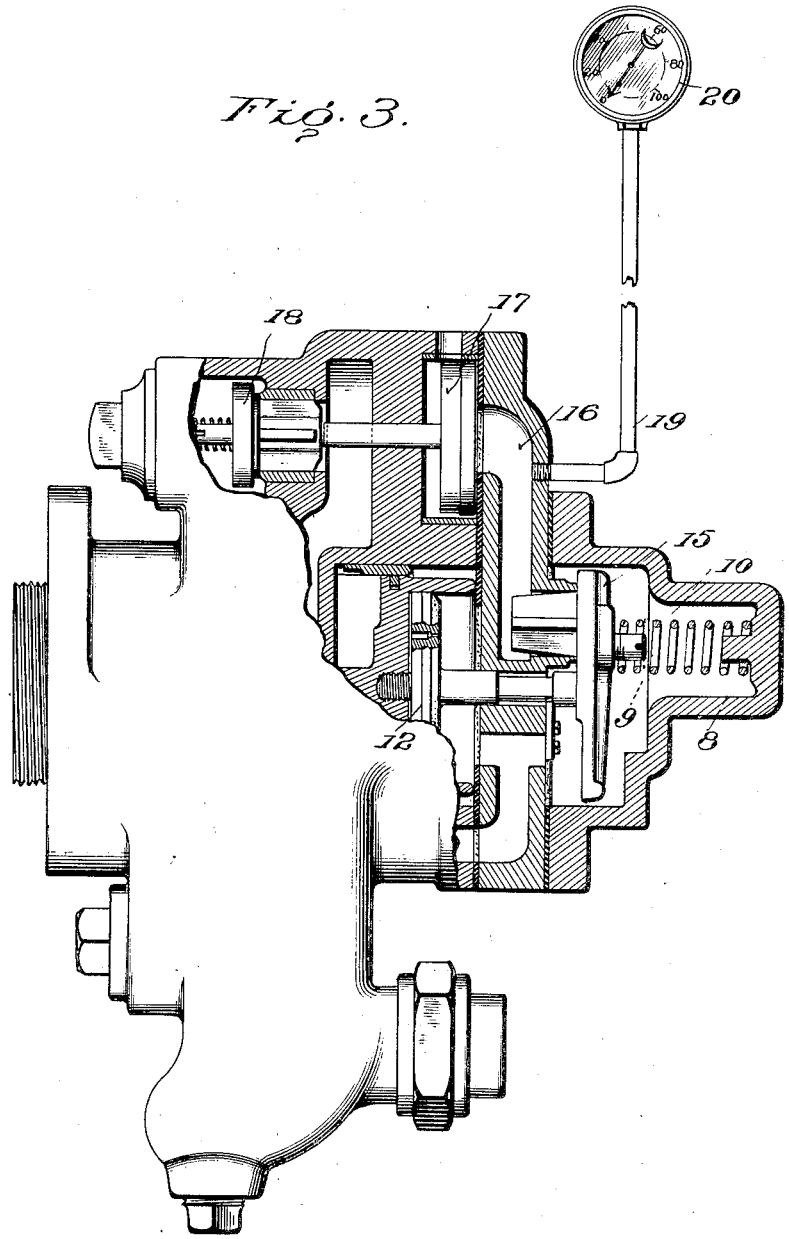

UNITED STATES PATENT OFFICE.

LEROY TUCKER, OF PERU, INDIANA, ASSIGNOR OF ONE-HALF TO JOHN A. SHUNK AND ONE-HALF TO THOMAS W. ANNABAL, OF PERU, INDIANA.

AIR-BRAKE SYSTEM.

No. 858,121.  Specification of Letters Patent.  Patented June 25, 1907.

Application filed October 19, 1906. Serial No. 339,717.

*To all whom it may concern:*

Be it known that I, LEROY TUCKER, a citizen of the United States, residing at Peru, in the county of Miami and State of Indiana, have invented certain new and useful Improvements in Air-Brake Systems; and I do hereby declare the following to be a full, clear, and exact description of the invention, such as will enable others skilled in the art to which it appertains to make and use the same.

My invention relates to certain new and useful improvements in air brake systems.

It frequently occurs, owing to the poor adjustment of the triple valve, that the emergency valve is opened when the engineer only desires a service application, and it is, under the present practice, very difficult to determine whether the triple valve has permitted the service or emergency pressure to enter the brake cylinder.

One of the objects of my invention is to provide the triple valves of an air brake system with a means whereby the fact that the triple valve has operated to cause the emergency pressure to go into the brake cylinder can be instantly discovered by any one. This feature of my invention is applicable to all forms of automatic brake systems using a triple valve or its equivalent.

Another object of my invention is to provide a means whereby when the emergency brake is applied an auxiliary reservoir will be drawn on, thereby producing greater braking pressure in the brake cylinder, consequently making the emergency brake more effective than it is under present conditions. This feature of the invention is particularly adapted for use in connection with the Westinghouse system, but it is to be understood that I also contemplate to adapt it to other systems, if found desirable.

Referring to the drawings wherein I show the preferred form of my invention, and wherein the same part is designated by the same reference numeral wherever it occurs, Figure 1 is a side view of a Westinghouse triple valve partly broken away and showing the same as provided with my invention, the auxiliary reservoir which I employ being shown on a much smaller scale than the valve in order to make the illustration clear, the parts of the valve being shown in normal position. Fig. 2 is a view similar to Fig. 1, showing however, the parts in the position they occupy for an emergency application of the brakes. Fig. 3 is a view partly broken away of the triple valve of the New York Air Brake Company, showing the same provided with my means for indicating the operation of the emergency valve.

Referring first to Figs. 1 and 2 in which the ordinary Westinghouse triple valve is illustrated, 1 designates a triple valve casing, 2 the emergency piston, 3 the emergency valve provided with a gasket 4, 5 the valve seat therefor, 6 the check valve. These parts are all of the ordinary well known Westinghouse construction. Tapped into the chamber 7, formed in the casing 1 between the emergency valve 3 and the check valve 6, is a pipe 8 which is connected to an auxiliary air cylinder 9 of suitable size and suitably located on the car. From the auxiliary cylinder 9 extends a pipe 10 having an air gage 11 secured thereto. This gage may be placed in any convenient point either within or underneath the car as may be found desirable. As the air in the chamber 7 is kept under train pipe pressure the auxiliary cylinder 9 will be filled with air under this pressure and the gage 11 will show approximately the train pipe pressure which usually is about seventy pounds. When a service application of the brakes is made the check valve 6 and the emergency valve 3 do not leave their seats and consequently the air in the auxiliary chamber is not drawn upon and the gage 11 will show approximately the train pipe pressure. When, however, the triple valve operates to produce the emergency pressure, then the emergency valve 3 is opened and also the check valve 6, this causes a material reduction in pressure in the train pipe and consequently in the chamber 7. The air in the auxiliary reservoir 9 flows down through the pipe 8 and adds to the volume of air available for use of the brake cylinder. This results in several pounds more pressure being produced in the brake cylinder than would otherwise be possible. This, of course, reduces the pressure in the auxiliary reservoir 9 and consequently the gage instead of showing approximately seventy pounds will now show approximately sixty. From this, it will be seen that a glance at the gage of the car will instantly show whether the emergency or service application has been made by the operation of the triple valve. By thus being able to determine readily whether a service or emergency pressure has been applied, it is possible to detect immediately, when it is thought that some of the triple valves are applying the emergency under service application by the engineer, which triple valve is defective and proper steps can then be taken to remedy it without any delay in hunting for the cause of the trouble.

In Fig. 3, I have shown my pressure gage when applied to the triple valve of the New York Air Brake Company's construction. In the New York air brake construction, the valve 15 is forced open when the emergency brake is to be applied and this permits train pipe pressure to flow up through the channel 16, against the piston 17, moving it back and opening the emergency valve 18. In the channel 16, there is normally no pressure and it is only when the emergency brake is applied that pressure occurs in this channel. In order to show whether the emergency or service application has been made, I tap the pipe 19 into the channel 16 and to the pipe attach a pressure gage 20. This gage can be located in any convenient place, as for instance, within a car or underneath the same. When a service application of a brake is made or when the brakes are released, the gage 20 shows no pressure in the channel 16. When, however, the triple valve is operated to open the emergency valve, then there is pressure in the channel 16 and this will show on the gage. By this means, the question as to whether an emergency or service application to the brake has been made can be readily and quickly determined by merely looking at the gage.

In the construction just described, no auxiliary reservoir is used because of the fact that pressure only exists in the channel 16 when the emergency is applied.

I desire to have it understood that if found desirable, my auxiliary reservoir could be used with this structure, the same being attached to a point where it would receive train pipe pressure under normal conditions and deliver the same to the brake cylinder upon the application of the emergency.

While I have described my invention in connection with two well known forms of triple valves, and air brake systems, I desire to have it understood that my invention is not limited to use in connection with such systems, but that these systems are shown and described merely for the sake of illustrating my invention.

While I have described what I believe to be the preferred form of my invention, I desire to have it understood that many changes may be made in the form, construction, arrangement and location of the parts without departing from the spirit of my invention.

What I claim as new and desire to secure by Letters Patent is:—

1. In an automatic air brake system operated by a triple valve having a valve adapted to be opened to produce the emergency pressure in a brake cylinder, of a pressure gage so connected to the triple valve as to indicate the change in pressure due to the opening of the emergency valve.

2. In an automatic air brake system operated by a triple valve having a valve adapted to be opened to produce the emergency pressure in a brake cylinder, of a pressure gage connected to the brake cylinder between the emergency valve and check valve to indicate the change in pressure due to the opening of the emergency valve.

3. In an automatic air brake system operated by a triple valve having a valve adapted to be opened to produce the emergency pressure in a brake cylinder, of an auxiliary cylinder connected to the triple valve to supply additional pressure when the emergency valve is opened.

4. In an automatic air brake system operated by a triple valve having a valve adapted to be opened to produce the emergency pressure in a brake cylinder, of an auxiliary reservoir connected to the triple valve between the emergency and check valve whereby when the emergency valve is opened, the brake cylinder will be furnished additional pressure from said auxiliary cylinder.

5. In an automatic air brake system operated by a triple valve having a valve adapted to be opened to produce the emergency pressure in a brake cylinder, of an auxiliary reservoir connected to the triple valve between the emergency and check valve whereby when the emergency valve is opened the brake cylinder will be furnished additional pressure from said auxiliary cylinder and a pressure gage connected to the auxiliary cylinder.

In testimony whereof I affix my signature, in presence of two witnesses.

LEROY TUCKER.

Witnesses:
ASA C. HAYNE,
ALBERT WARD.